United States Patent
Schenk (10) Patent No.: US 7,226,355 B2
(45) Date of Patent: Jun. 5, 2007

(54) MECHANISM AND METHOD FOR AUTOMATICALLY TRANSVERSELY POSITIONING THE PINCH-POINT OF A CONCAVE

(75) Inventor: Charles R. Schenk, South Bend, IN (US)

(73) Assignee: CNH America LLC, New Holland, PA (US)

( * ) Notice: Subject to any disclaimer, the term of this patent is extended or adjusted under 35 U.S.C. 154(b) by 17 days.

(21) Appl. No.: 11/356,647

(22) Filed: Feb. 17, 2006

(65) Prior Publication Data
US 2006/0160587 A1  Jul. 20, 2006

Related U.S. Application Data

(62) Division of application No. 10/755,806, filed on Jan. 12, 2004, now Pat. No. 7,118,475.

(51) Int. Cl.
*A01F 12/28* (2006.01)
(52) U.S. Cl. ...................... 460/109; 241/89.1
(58) Field of Classification Search ................ 460/109, 460/108, 107, 67; 241/89.1, 51; 99/523
See application file for complete search history.

(56) References Cited

U.S. PATENT DOCUMENTS

| | | | |
|---|---|---|---|
| 2,053,148 A * | 9/1936 | James | 460/67 |
| 3,385,438 A | 5/1968 | Fisher | |
| 3,470,881 A | 10/1969 | Knapp et al. | |
| 3,593,719 A | 7/1971 | Islington et al. | |
| 3,631,862 A | 1/1972 | Rowland-Hill et al. | |
| 3,871,384 A | 3/1975 | Depauw et al. | |
| 3,974,837 A * | 8/1976 | Applegate | 460/105 |
| 4,330,000 A | 5/1982 | Peiler | |
| 4,375,221 A | 3/1983 | Bernhardt et al. | |
| RE31,257 E * | 5/1983 | Glaser et al. | 460/80 |
| 4,425,925 A | 1/1984 | Kersting et al. | |
| 4,712,568 A | 12/1987 | Strong et al. | |
| 4,802,496 A | 2/1989 | Bennett | |
| 4,805,643 A | 2/1989 | Tetaka | |
| 4,897,072 A | 1/1990 | Bestland | |
| 5,041,059 A | 8/1991 | Ricketts et al. | |
| 5,395,287 A | 3/1995 | Coers | |
| 5,489,239 A | 2/1996 | Matousek et al. | |
| 5,919,087 A | 7/1999 | Strong et al. | |
| 6,358,142 B1 | 3/2002 | Imel et al. | |
| 6,443,835 B1 | 9/2002 | Imel et al. | |
| 6,485,364 B1 | 11/2002 | Gryspeerdt et al. | |
| 6,485,365 B2 | 11/2002 | Imel et al. | |
| 6,503,142 B2 | 1/2003 | Imel et al. | |
| 6,530,833 B2 | 3/2003 | Imel et al. | |

FOREIGN PATENT DOCUMENTS

EP       0841001       5/1998

* cited by examiner

*Primary Examiner*—Árpád Fábián Kovács
(74) *Attorney, Agent, or Firm*—Michael G. Harms; John William Stader; Stephen A. Bucchianeri (57) ABSTRACT

A device and method is disclosed for allowing a combine operator, from the operator's station, to automatically transversely position a pinch-point of a concave relative to a rotor of a combine in accordance with the clearance spacing set between the concave and the rotor, thereby minimizing operator effort without sacrificing combine performance.

14 Claims, 9 Drawing Sheets

MECHANISM AND METHOD FOR AUTOMATICALLY TRANSVERSELY POSITIONING THE PINCH-POINT OF A CONCAVE

This divisional application claims priority under 35 U.S.C. § 120 from U.S. patent application Ser. No. 10/755,806 filed on Jan. 12, 2004 now U.S. Pat. No. 7,118,475 by Charles R. Schenk with the same title, the full disclosure of which is hereby incorporated by reference.

BACKGROUND OF THE INVENTION

FIELD OF THE INVENTION

The present invention relates generally to a mechanism and method for automatically transversely positioning a pinch-point of a concave relative to a rotor of a combine according to the clearance spacing set between the concave and the rotor, the mechanism and met hod minimizing operator effort without sacrificing combine performance.

Agricultural combines are well known in the art for harvesting and threshing a number of various agricultural crops, including for example wheat, soybeans, corn, etc. Usually, agricultural combines include a harvesting apparatus, an infeed mechanism, and a separating apparatus. In operation, the harvesting apparatus reaps the crop, which is planted in the ground. After reaping, the infeed mechanism feeds the crop to the separating apparatus.

Typically, the separating apparatus in a rotary combine includes at least one rotor, which can extend axially or transversely within the body of the combine, and which is surrounded at least in part by a perforated concave having a plurality of apertures. As shown for example in U.S. Pat. No. 5,489,239 titled "Rotary Combine" and issued Feb. 6, 1996 to Case Corporation, the same assignee as for the present application, the concave can include a series of concave inserts arranged in a side-by-side configuration, with each concave insert extending partially circumferentially around the rotor. Generally, it is desirable to provide for an adjustment of the concave relative to the rotor of the combine.

To optimize the threshing potential of different crop types and threshing conditions, a combine operator must set the appropriate clearance spacing between the concave and the rotor. Additionally, the operator must also transversely pivot the concave relative to the rotor to properly position the "pinch-point" (e.g. the primary area where the rotor threshes the crop grain against the concave) according to the type of crop grain to be threshed.

For example, for the "hard threshing" of wheat, it is beneficial for the pinch-point to be positioned at the "lead in" section of the concave so that the rotor will contact the crop grain immediately upon its downward rotation toward the concave. In contrast, for the "easy threshing" of corn, it is advantageous to position the pinch-point at the "lead out" section of the concave so that the rotor will contact the crop grain upon its upward rotation away from the concave. Accordingly, proper positioning of the pinch-point maximizes threshing potential.

While the benefits and advantages of properly positioning the pinch-point of a concave are known, current positioning mechanisms and methods prove cumbersome and inefficient. For example, current mechanisms and methods do not allow a combine operator to seamlessly switch between the threshing of "hard" crop grain and the threshing of "easy" crop grain. Instead, the operator must first stop and exit the combine and adjust the concave pivot I-bolts before switching to the threshing of a different type of crop grain. Such a process can be physically demanding and time consuming and can increase machine setup complexity and reduce overall machine capacity.

Accordingly, the drawbacks of the currently known mechanisms and methods for adjusting and positioning the pinch-point of a concave relative to the rotor of a combine have been known within the industry without any marked improvement to date. Thus, the need exists for the present invention, which provides a mechanism and method for automatically positioning the pinch-point of a concave in accordance with the clearance spacing set by the operator.

It is accordingly the primary objective of the present invention that it provide an improved transverse concave pivot assembly mechanism and method for optimizing threshing potential for different types of crop grain and different threshing conditions.

It is another objective of the present invention that it provide at least one transverse pivot axis for allowing automatic transverse positioning of the pinch-point of a concave in accordance with the clearance spacing set between the concave and the rotor.

It is yet an additional objective of the present invention that it be efficient and effortless so as to minimize operator effort without sacrificing combine performance.

The transverse pivot assembly mechanism and method of the present invention must also be of a construction which is both durable and long lasting, and it should also require little or no maintenance to be provided by the user throughout its operating lifetime. In order to enhance the market appeal of the transverse pivot assembly mechanism and method of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a mechanism and method for automatically transversely positioning a pinch-point of a concave relative to a rotor of a combine according to the clearance spacing set between the concave and the rotor, is provided. Accordingly, the present invention is used in conjunction with a combine for harvesting crop grain material.

Commonly, such combines include a mobile frame and at least one crop-threshing rotor having a longitudinal axis of rotation, the rotor being supported by the frame. A concave having a first side and a second side is movably supported at least partially around the circumference of the rotor at a clearance spacing extending generally radially outward therefrom. The concave further includes a plurality of concave inserts outwardly removable away from the rotor in a direction transverse to the longitudinal axis of said rotor.

Generally, a first side of the concave is coupled to the combine by a pivot assembly, which, historically, allowed for pivotal movement of the concave outward relative to the rotor of the combine. Additionally, an adjustment mechanism couples a second side of the concave to the combine and allows for the adjustment of clearance spacing between the concave and the rotor.

Depending on the clearance spacing and the transverse positioning of the concave relative to the rotor, different types of crop grain can be threshed. For example, for the "hard threshing" of wheat, the concave is generally transversely positioned so that the pinch-point is at the lead in section of the concave. Alternatively, for the "easy threshing" of corn, the pinch-point is generally transversely positioned toward the lead out section of the concave.

The present invention allows a combine operator, while in the operator's station, to automatically transversely position the concave pinch-point in accordance with the clearance spacing set between the concave and the rotor. Thus, previously known manual mechanisms and methods are made obsolete as the present invention works efficiently and effortlessly, thereby minimizing operator effort without sacrificing combine performance.

In a preferred embodiment of the present invention, the transverse pivot assembly mechanism includes a linking assembly, which pivotally couples a first side of the concave to the combine, the pivot assembly defining at least one transverse pivot axis.

In another aspect of the embodiment, the linking assembly includes at least one set of linking members, each set of linking members generally including a first linking member and a second linking member, the sets of linking members being substantially similar in size and shape and having first and second ends. Alternatively, in another aspect of the present invention, one linking member of each set is generally longer than the other linking member of the set.

In yet a further aspect of the present invention, the linking assembly further includes at least one mounting bracket securely mounted to the body of the combine. Preferably, a corresponding mounting bracket exists for each set of linking members. Accordingly, in a preferred aspect of the present embodiment, the first ends of each linking member of each set are pivotally coupled to the first side of the concave while the second ends of each linking member of each set are pivotally coupled to a corresponding mounting bracket.

In yet another aspect of the preferred embodiment of the present invention, the second ends of each of the linking members are pivotally coupled directly to the body of the combine rather than to a corresponding mounting bracket. Regardless, it is contemplated that, when properly mounted, the first linking member of each set will be positioned substantially angular relative to the second linking member of the set, thereby forming a generally "crossed" or "X-shaped" configuration.

In yet an additional aspect of the present invention, the first end of the first linking member of each set is pivotally coupled to the concave in a horizontal plane different than the horizontal plane in which the first end of the second linking member of each set is pivotally coupled. In a related aspect of the present invention, the second end of the first linking member of each set is pivotally coupled to a corresponding mounting bracket or the combine in a horizontal plane different than the horizontal plane in which the second end of the second linking member of each set is pivotally coupled.

However, it should be understood that instead of the first ends and second ends of each set of linking members being pivotally coupled in different horizontal planes, the linking members could alternatively have similar or identical lengths and have first and second ends pivotally coupled in similar or identical horizontal planes.

In an alternative preferred embodiment of the present invention, the linking assembly includes at least one non-rotatable member, at least one rotatable shaft, at least one rotatable member, and at least one linking member. In one aspect of the alternative preferred embodiment, the non-rotatable member is mounted to, or unitarily configured with, the first side of the concave while the rotatable member is mounted to the rotatable shaft for rotation therewith.

In yet an additional aspect of the alternative preferred embodiment, the linking member couples at least one of the non-rotatable member and the first side of the concave with at least one of the rotatable shaft and the rotatable member.

In yet another aspect of the alternative preferred embodiment, the non-rotatable member can be a gear having a plurality of tines upon its peripheral surface. In a related aspect, the rotatable member can also be a gear having a plurality of tines upon its peripheral surface, the plurality of tines of the rotatable gear being engageable with the plurality of tines of the non-rotatable gear.

In a final aspect of the present invention, a method is provided for automatically transversely pivoting and positioning a pinch-point of a concave in accordance with the clearance spacing set by the operator. In line with the aforementioned preferred embodiments of the present invention, the method includes: providing a rotor having a longitudinal axis of rotation; providing at least one concave having a first side and a second side spaced circumferentially around the rotor and including a plurality of concave inserts outwardly removable away from the rotor in a direction transverse to the longitudinal axis of the rotor; providing a transverse pivot assembly mechanism for automatically positioning a pinch-point of the concave relative to the rotor of the combine, the transverse pivot assembly mechanism including a linking assembly for pivotally coupling the first side of the concave to the combine; providing an adjustment mechanism, the adjustment mechanism adjustably coupling the second side of the concave to the combine; and actuating the adjustment mechanism to effect movement and clearance spacing of the concave relative to the rotor of the combine, the pinch-point being automatically transversely positioned according to the clearance spacing set between the concave and the rotor.

The transverse pivot assembly mechanism of the present invention is of a construction which is both durable and long lasting, and which will require little or no maintenance to be provided by the user throughout its operating lifetime. The transverse pivot assembly mechanism of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENTS

Figure 1:
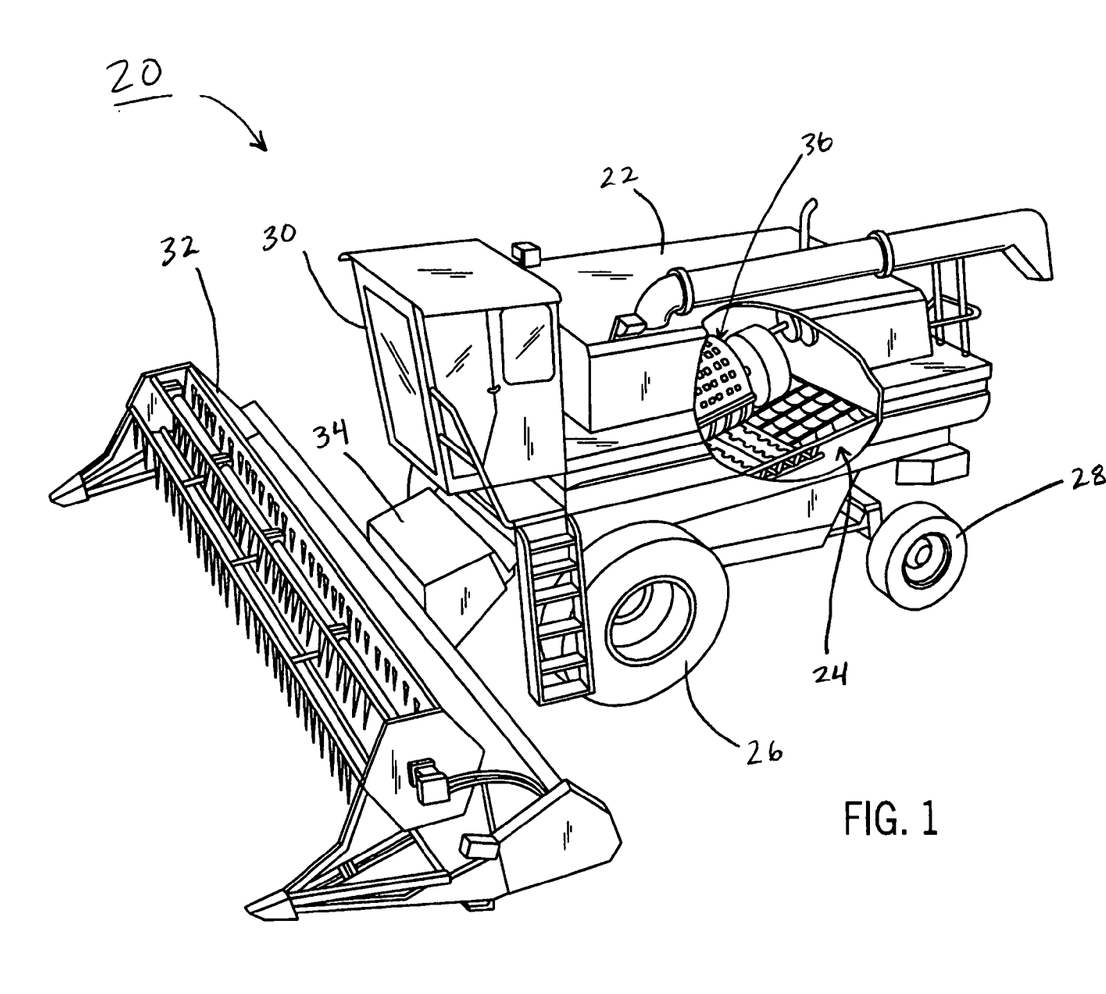
FIG. 1 is a perspective view, partially broken away, of an agricultural combine.

Referring to the drawings, FIG. 1 shows a conventional self-propelled rotary combine 20 that includes a housing or body 22 defining an internal open area or space 24. The body 22, which can include a supporting frame, is supported on front drive wheels 26 and steerable rear wheels 28. The combine 20 is powered by an engine (not shown) and controlled from an operator's station 30.

A crop harvesting apparatus 32, otherwise referred to as a header, and an infeed mechanism 34 are attached at a forward end of the combine 20. The infeed mechanism 34 feeds crop materials to a rotor assembly 36 enclosed within the body 22. One example of a rotary combine configured with a rotary assembly 36 is disclosed in U.S. Pat. No. 5,489,239, titled "Rotary Combine" and which issued Feb. 6, 1996 to Case Corporation, the same assignee as the present application, and which is hereby incorporated herein by reference.

Figure 2:
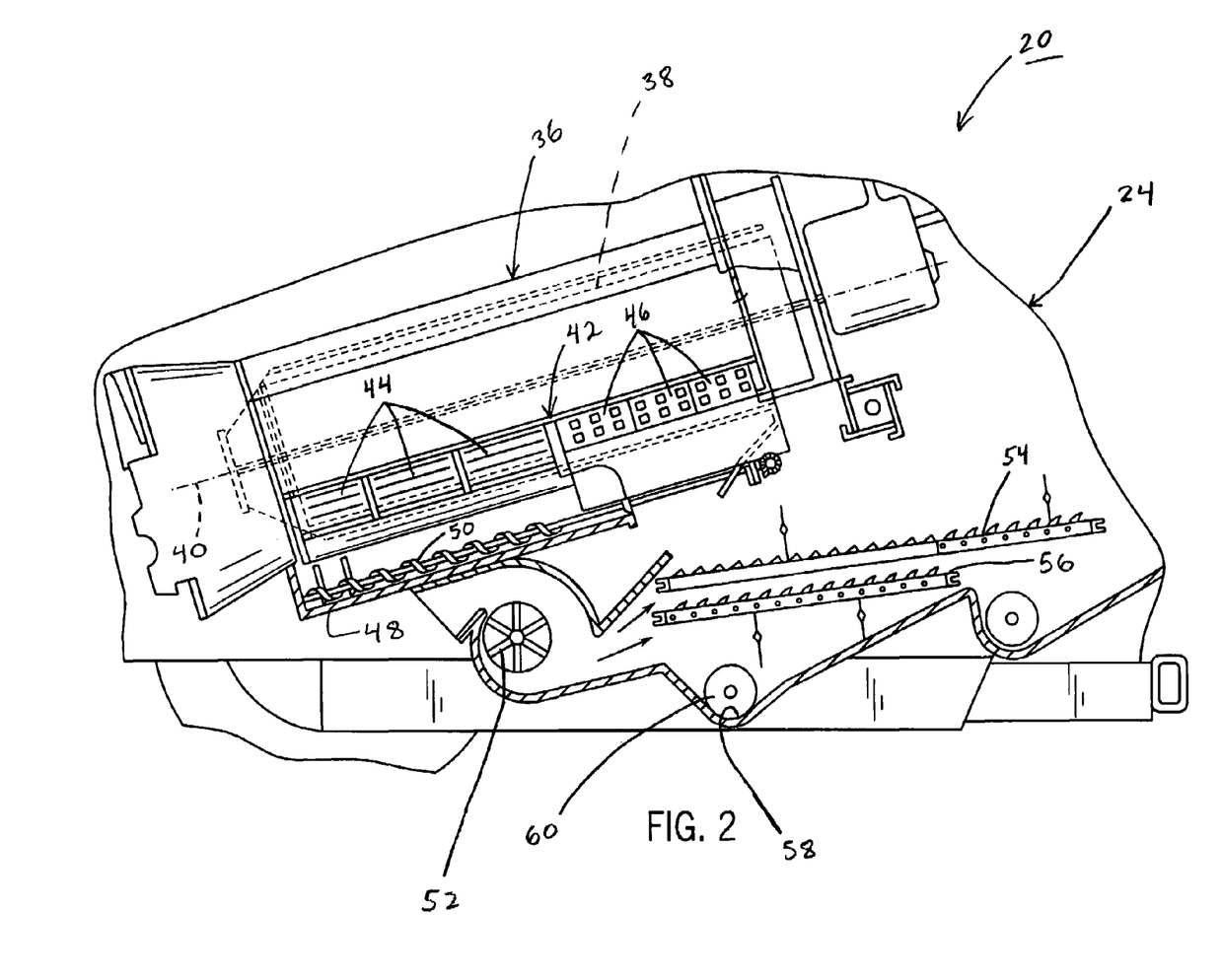
FIG. 2 is a partial side view of a separating apparatus of the combine shown in FIG. 1.

As best shown in FIG. 2, the rotor assembly 36 is preferably configured as a single axial unit that threshes and separates crop materials presented thereto into grain and other materials. However, it should be appreciated that the rotary combine 20 could be configured with more than one rotary assembly 36, for example, with two units arranged in a parallel configuration. The rotor assembly 36 is mounted in the internal area 24 defined by the body 22 (FIG. 1).

The rotor assembly 36 includes a rotor 38 with a longitudinal extent rotatably mounted to the body 22 about a longitudinal axis of rotation 40, which extends axially along the length of the combine 20. It should be understood that the term "longitudinal" means of or relating to length or the lengthwise dimension. It should also be understood that the rotor 38, with its longitudinal extent, could be mounted within the body 22 so as to extend laterally from side-to-side within the combine 20.

It should be understood that the terms "left side," "right side," "left," "right," "front," "rear," "upper," "lower," "top," and "bottom," and their derivatives, as used herein, are intended to indicate directions relative to the views presented in the Figs., and in particular, from a perspective when viewing the rotary combine of FIG. 1, and the internal components thereof, from the crop harvesting apparatus 32 toward the steerable rear wheels 28.

Referring back to FIG. 2, between the upstream, or front end, and the downstream, or rear end, of the rotor assembly 36, the crop material is threshed as it spirals around the rotor 38 against a concave 42 disposed at least partially, circumferentially around the rotor 38. The rotor 38 can be dimensioned with a broad range of diameters, depending on the desired size and performance characteristics of the combine 20.

For example, suitable rotors 38 may have a diameter in the range of fifteen inches to thirty inches, although it should be appreciated that other diameters, larger and smaller, would also work for the purposes of this invention. The rotor 38 is configured with suitable instrumentalities (not shown) mounted on the peripheral surface thereof that cooperate with the concave 42 to thresh the crops introduced therebetween.

As shown in FIG. 2, the concave 42 can include various semi-cylindrical concave inserts 44 and grate inserts 46, which are generally provided in a lower arcuate fashion and supported by a concave frame (not shown). The rotor 38 is preferably made of steel, and is generally rotated at speeds of between 150 to 1500 revolutions per minute, depending on the type of crop being threshed, and the conditions under which the threshing is being performed. It should be understood, however, that the speed of the rotor 38 is not critical to the operation of the invention, and that other speeds, faster and slower, may be desired and suitable for the purposes of the present invention without detracting or departing from the scope thereof.

Still referring to FIG. 2, the concave inserts 44 and grate inserts 46 each have a plurality of apertures that allow the grain to be separated from the other crop material as the grain passes through the apertures. Most of the grain drops onto a grain pan 48. The grain is thereafter conveyed rearward from the grain pan 48 by an auger mechanism 50 for subsequent cleaning and collection. Straw, tailings and other waste crop material are impelled rearwardly out of the discharge end of the rotor assembly 36 where a rotary beater throws the straw and other waste material rearwardly from the combine.

The combine 20 further includes a cleaning system for cleaning chaff, straw, tailings and other foreign material from the grain. For example, the cleaning system can include a cleaning fan 52, a chaffer sieve 54, a grain sieve 56, and a clean grain collector 58. A suitable auger mechanism 60 directs clean grain from the clean grain collector 58 into a hopper or grain bin (not shown). It should be understood that other cleaning systems would be suitable for the purposes of the present invention without detracting or departing from the scope thereof.

Figure 9:
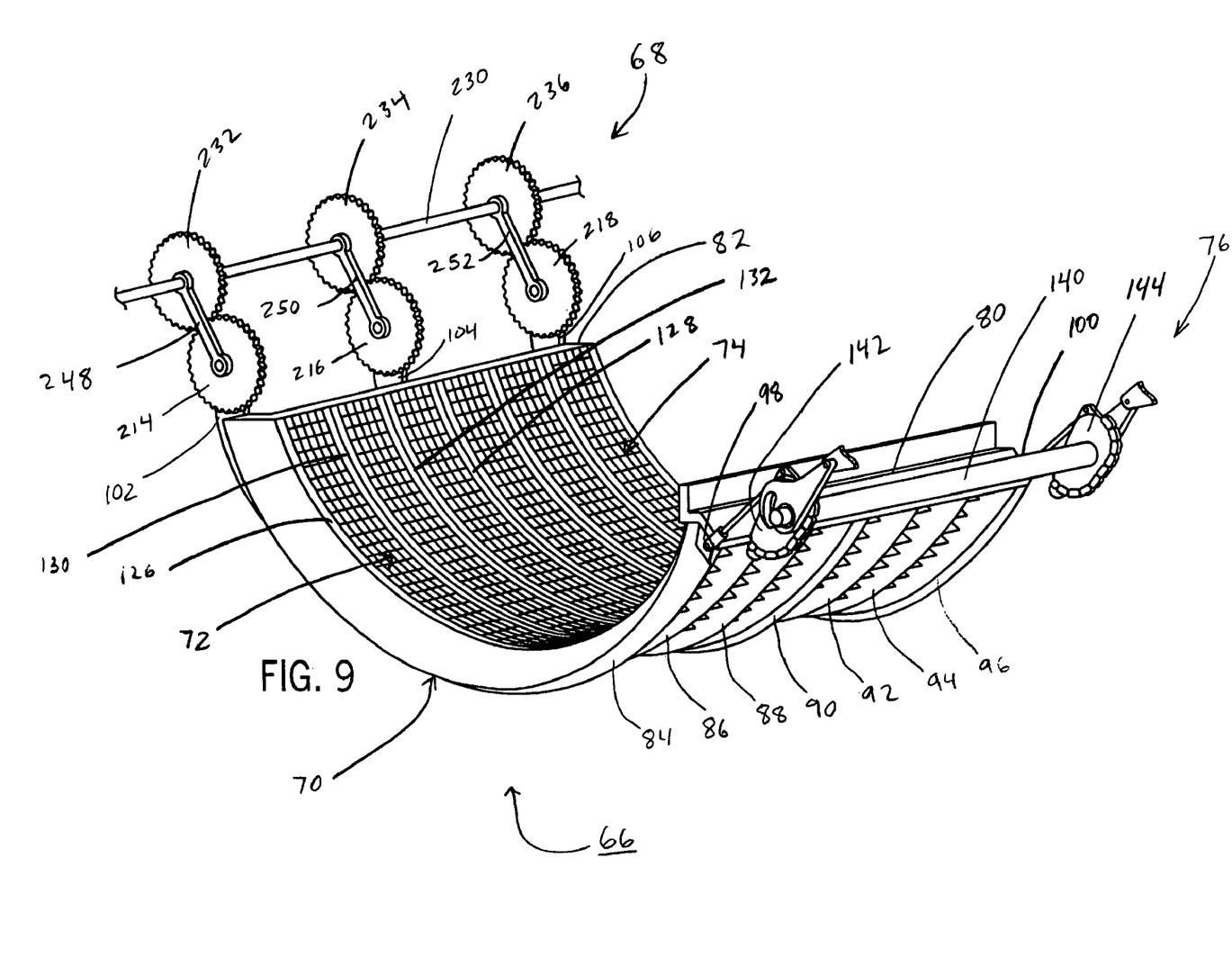
FIG. 9 is a front, right side perspective view showing a concave adjustment mechanism and an alternative preferred embodiment of a transverse pivot assembly mechanism of the separating apparatus shown in FIG. 2.
Figure 10:
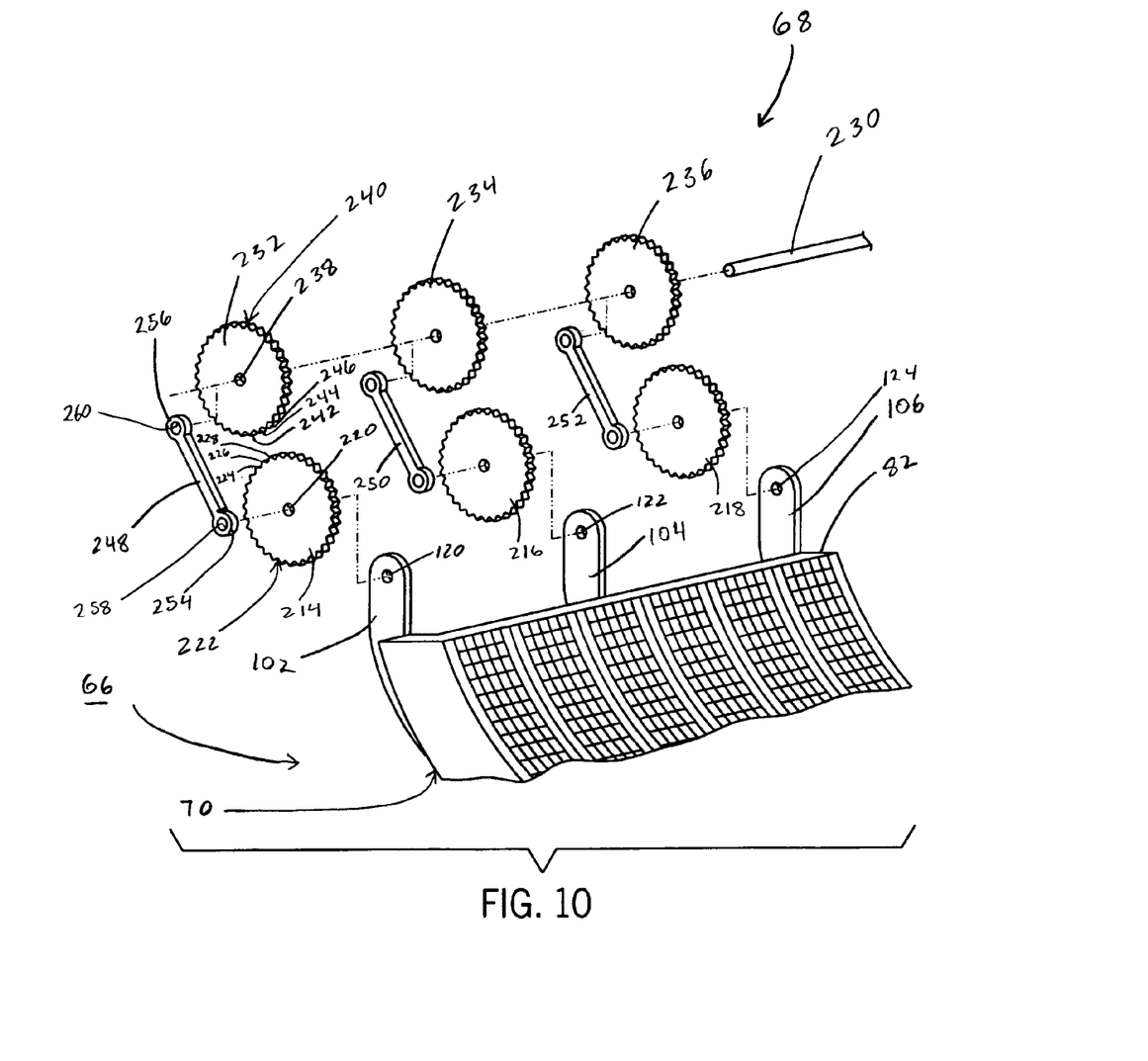
FIG. 10 is a partial exploded view of the transverse pivot assembly mechanism shown in FIG. 9.
Figure 11:
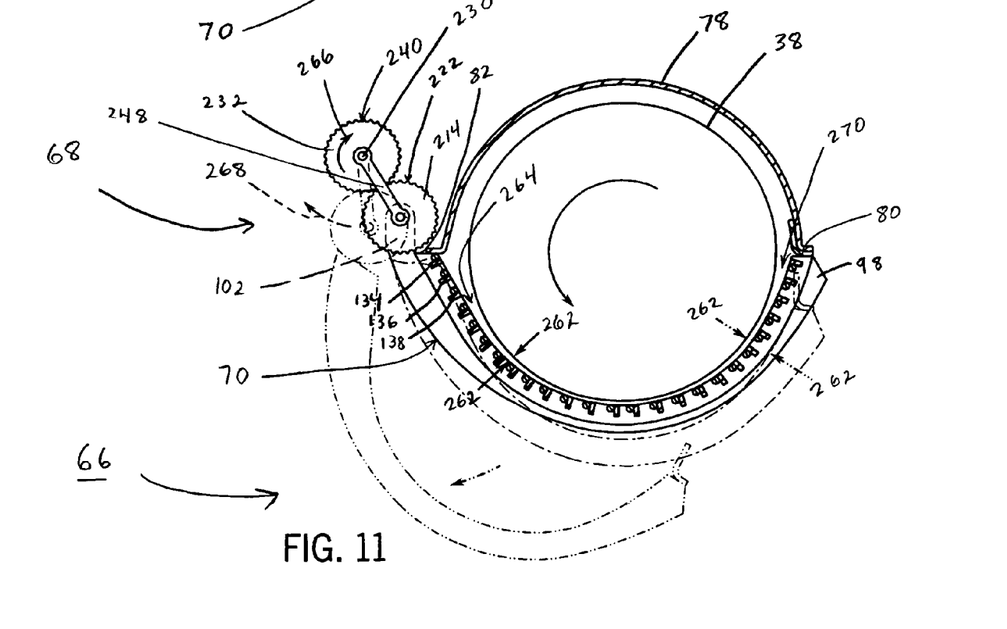
FIG. 11 is an enlarged front end longitudinal view, in the "hard threshing position," "easy threshing position (shown in broken lines)," and "fully opened position" (i.e. extended range) (shown in broken lines), of the transverse pivot assembly mechanism shown in FIG. 9.

Referring now to FIGS. 3, and 5–8, shown is a concave 62, including a preferred transverse pivot assembly mechanism 64. Referring next to FIGS. 9–11, shown is a concave 66, including an alternative preferred transverse pivot assembly mechanism 68. It should be understood that each of the concaves 62 and 66 are preferably structurally identical with the exception of certain structural aspects of the preferred transverse pivot assembly mechanism 64 and the alternative preferred transverse pivot assembly mechanism 68.

Accordingly, the structure of the concaves 62 and 66 will be discussed together and will include identical numbering for identical structural parts. However, any discussion regarding unique structural and operational aspects of the preferred transverse pivot assembly mechanism 64 and the alternative preferred transverse pivot assembly mechanism 68 will be discussed separately and include distinct numbering.

Figure 3:
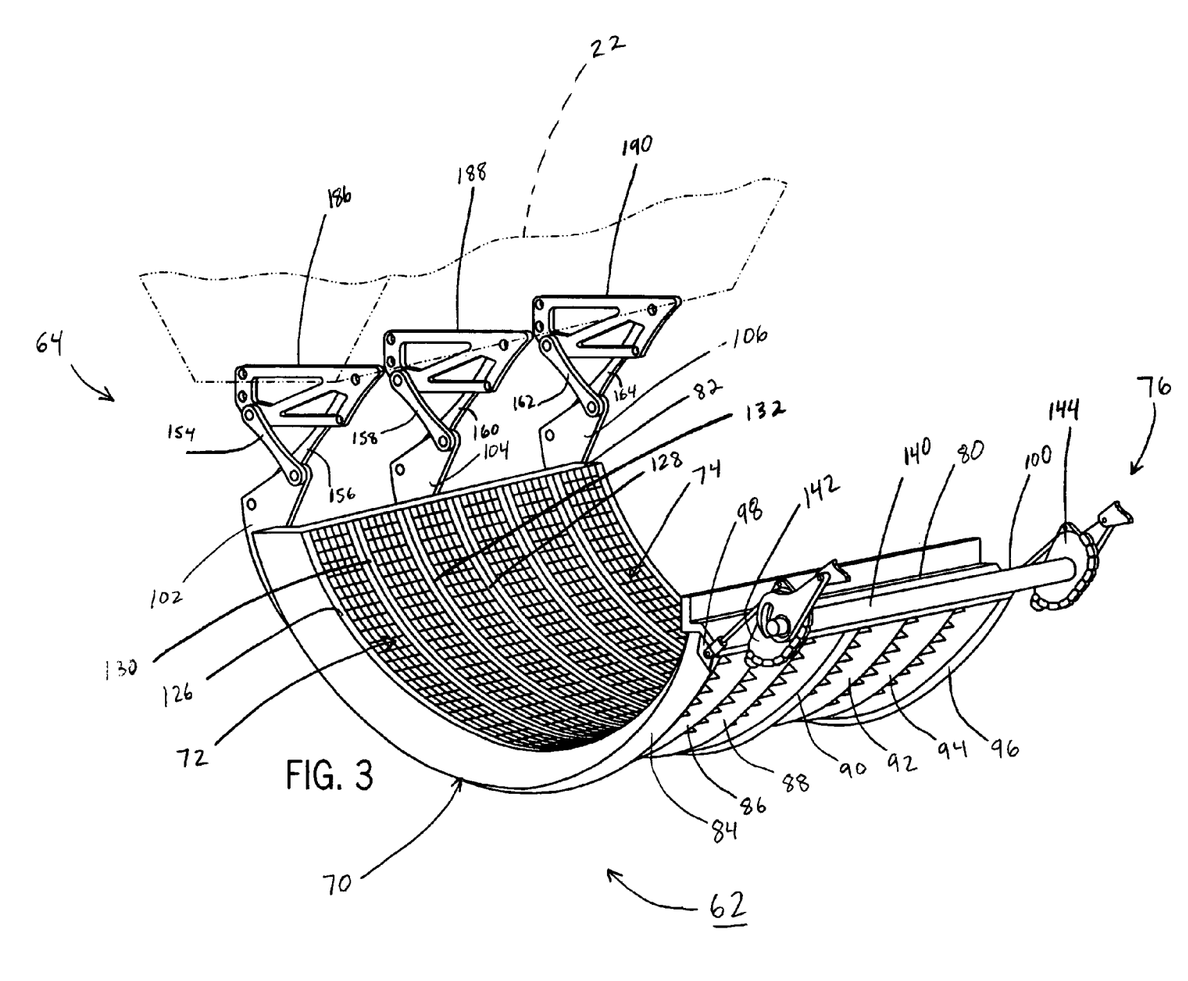
FIG. 3 is a front, right side perspective view showing a concave adjustment mechanism and a preferred embodiment of a transverse pivot assembly mechanism of the separating apparatus shown in FIG. 2.

Referring to FIGS. 3 and 9, it can be seen that the concaves 62 and 66 each include a concave frame 70, which supports a plurality of concave inserts, such as a concave insert 72 and a concave insert 74. The concaves 62 and 66 further include a concave adjustment mechanism 76, such as known in the art and as will be discussed in further detail later.

As further shown in FIGS. 3 and 5–11, it can be seen that the concave frame 70 extends generally circumferentially around, and longitudinally along, the lower hemisphere of the rotor 38. A rotor shield 78 extends generally circumferentially around, and longitudinally along, the upper hemisphere of the rotor 38. Included as part of the concave frame 70 is a longitudinally extending right frame rail 80 and a longitudinally extending left frame rail 82.

The right frame rail 80 and the left frame rail 82 are preferably spaced between about 160 degrees to about 190 degrees relative to each other, and more preferably at about 180 degrees. However, it should be understood that the right frame rail 80 and the left frame rail 82 can be spaced at lesser angles, such as 120 degrees or less.

As illustrated in FIGS. 3 and 9, the concave frame 70 further includes a plurality of rib members, such as a primary rib member 84, a secondary rib member 86, a secondary rib member 88, a primary rib member 90, a secondary rib member 92, a secondary rib member 94, and a primary rib member 96. The plurality of rib members 84, 86, 88, 90, 92, 94, and 96 extend transversely between the right frame rail 80 and the left frame rail 82 of the concave frame 70.

It is preferred that the plurality of rib members 84, 86, 88, 90, 92, 94, and 96 be longitudinally spaced from one another so that a series of openings are formed between each successive rib member. It should be appreciated that additional or fewer rib members could be used to define more or less openings. Regardless, it is preferred that each one of the plurality of rib members 84, 86, 88, 90, 92, 94, and 96 be generally arcuate in shape and have an upper arcuate edge (not shown) and a radius substantially the same as, or slightly greater than, the radius of the rotor 38.

As shown generally in FIGS. 3 and 9, the primary rib members 84 and 96 define lugs, such as a rib lug 98 and a rib lug 100, adjacent to the right frame rail 80 of the concave frame 70. As further illustrated in FIGS. 3, 5, 9, and 10, the primary rib members 84, 90, and 96 define additional lugs, such as a shoulder lug 102, a shoulder lug 104, and a shoulder lug 106, adjacent to the left frame rail 82.

Figure 5:
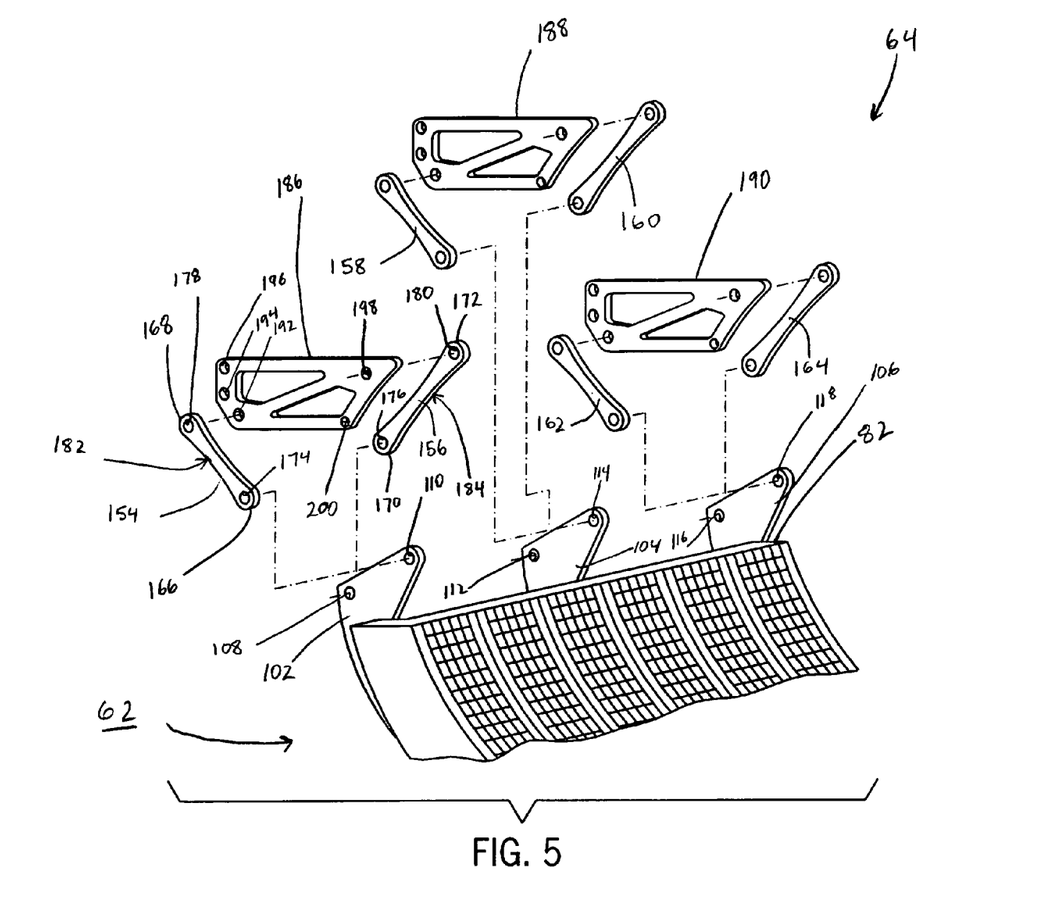
FIG. 5 is a partial exploded view of the transverse pivot assembly mechanism shown in FIG. 3.

Referring now to FIG. 5, and in reference to the preferred transverse pivot assembly mechanism 64, it can be seen that the shoulder lugs 102, 104, and 106 each include a set of apertures, such as a lower aperture 108 and an upper aperture 110, a lower aperture 112 and an upper aperture 114, and a lower aperture 116 and an upper aperture 118. In contrast, and in reference to the alternative preferred transverse pivot assembly mechanism 68 shown in FIG. 10, the shoulder lugs 102, 104, and 106 can alternatively include only a single aperture, such as an aperture 120, an aperture 122, and an aperture 124, respectively.

Turning back to FIGS. 3 and 9, it can be seen that each of the concaves 62 and 66 further includes concave inserts 72 and 74. In general, the concave inserts 72 and 74 are releasably mounted to the concave frame 70 in a side-by-side configuration. As shown in FIGS. 3 and 9, each of the concave inserts 72 and 74 are generally arcuate in shape and have a circumferential span of approximately 90 degrees. Because both of the concave inserts 72 and 74 are preferably structurally identical, it will be appreciated that only a detailed description will be made in reference to the concave insert 72.

As illustrated by the concave insert 72, two opposite side frame members, such as a side frame member 126 and a side frame member 128, transversely extend along the circumferential span of the concave insert 72. Similarly, an intermediate frame member 130 and an intermediate frame member 132 also transversely extend along the circumferential span of the concave insert 72.

Turning now to FIGS. 6–8 and 11, it can further be seen that the concave insert 72 includes a plurality of longitudinal frame members, such as a longitudinal frame member 134, a longitudinal frame member 136, a longitudinal frame member 138, etc. Each of the longitudinal frame members 134, 136, 138, etc. extends longitudinally between the side frame members 126 and 128 (not shown in FIGS. 6–8 and 11) of the concave insert 72. Thus, in cooperation with the concave frame 70, the concave insert 72 forms a plurality of apertures through which crop grain product passes for collection by the grain pan 48 (not shown).

Referring again to FIGS. 3 and 9, it can be seen that each of the concaves 62 and 66 further includes a concave adjustment mechanism 76. One example of a preferred concave adjustment mechanism 76 is depicted by FIGS. 3, 9, and, more specifically, FIG. 4, and is disclosed in a copending U.S. patent application Ser. No. 10/755,774, titled "Apparatus and Method for Effecting Movement and Clearance Spacing of a Concave", filed Jan. 12, 2004 on behalf of CNH America LLC, the same assignee as in the present application, and which is hereby incorporated herein by reference.

Figure 4:
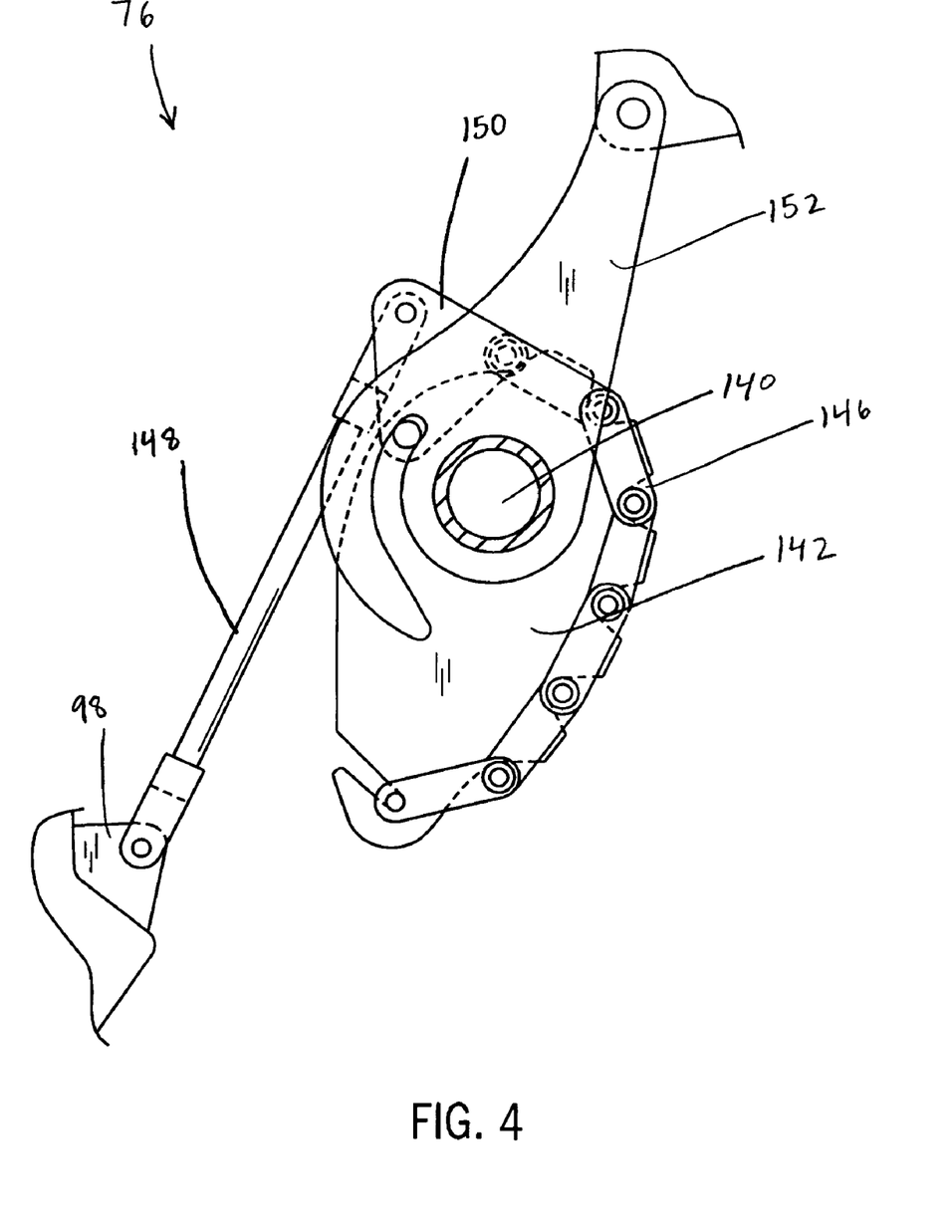
FIG. 4 is an enlarged, partial front end longitudinal view of the concave adjustment mechanism shown in FIG. 3.

Generally, the concave adjustment mechanism 76 includes a rotatable shaft 140 that extends longitudinally above and along the right frame rail 80 of the concave frame 70. An actuation motor (not shown), operable from the operator's station 30 (not shown) of the combine 20 (not shown), is preferably coupled to the rotatable shaft 140 to provide rotational force for activation of the adjustment mechanism 76.

Mounted upon the rotatable shaft 140 at each end is a suitable rotatable member, such as a cam sprocket 142 and a cam sprocket 144. It can be seen that the cam sprockets 142 and 144 are securely mounted to the rotatable shaft 140 for rotation therewith. Because both the cam sprockets 142 and 144 are preferably structurally identical and include preferably structurally identical related components, it will be understood that only a detailed description will be made in reference to the cam sprocket 142 and its associated components.

Focusing now on FIG. 4, an enlarged longitudinal view of the concave adjustment mechanism 76 is shown. As illustrated it is preferred that the cam sprocket 142 be configured to accommodate a flexible linkage, such as a chain 146, a rigid link 148, and a connection link 150, which couples the chain 146 to the rigid link 148. The concave adjustment mechanism 76 further includes a capturing device 152, which generally acts as a travel limit to prevent the concaves 62 and 66 from being raised into the rotor 38 and damaged.

Turning now to FIGS. 3 and 5–8, the preferred transverse pivot assembly mechanism 64 of the present invention will be discussed. As depicted in FIGS. 3 and 5, it is desired that the preferred transverse pivot assembly mechanism 64 include three sets of linking members, such as a linking member 154 and a linking member 156, a linking member 158 and a linking member 160, and a linking member 162 and a linking member 164.

However, it is also contemplated that additional or fewer sets of linking members could be used, depending upon factors such as the dimensions of the concave 62, the rotor 38, etc. Regardless, it will be appreciated that because each set of the three sets of linking members 154 and 156, 158 and 160, and 162 and 164 are preferably structurally identical, only a detailed description will be made in reference to the first set of linking members 154 and 156.

Focusing now on FIG. 5, it can be seen that the linking members 154 and 156 are generally similarly shaped, such as in a "dog bone" configuration, with the linking member 156 being slightly longer than the linking member 154. However, it is contemplated that the linking members 154 and 156 could alternatively be inconsistently or identically shaped and dimensioned.

Regardless, it is preferred that the linking member 154 includes a first end 166 and a second end 168. Likewise, it is preferred that the linking member 156 includes a first end 170 and a second end 172. Located preferably at the first ends 166 and 170 of the linking members 154 and 156 are apertures, such as a lower aperture 174 and a lower aperture 176, respectively. Similarly, located preferably at the second ends 168 and 172 of the linking members 154 and 156 are apertures, such as an upper aperture 178 and an upper aperture 180, respectively.

Joining the first end 166 and the second end 168 of the linking member 154 is a span portion 182. Likewise, joining the first end 170 and the second end 172 of the linking member 156 is a span portion 184. It is contemplated that each of the span portions 182 and 184 has a lesser width dimension than the width dimensions defined by each of the first ends 166 and 170 and the second ends 168 and 172 of the linking members 154 and 156.

However, it should be understood that the size and shape of the linking members 154 and 156 are generally unimportant and may be altered as desired. Further, while it is preferred that the linking members 154 and 156 be sufficiently rigid, they could alternatively be constructed of any suitable load-bearing metal, alloy, or flexible material.

Referring again to FIGS. 3 and 5, it can be seen that the preferred transverse pivot assembly mechanism 64 further preferably includes a mounting bracket 186, a mounting bracket 188, and a mounting bracket 190. It is contemplated that a single mounting bracket, such as the mounting bracket 186, will correspond to a single set of linking members, such as the linking members 154 and 156. However, additional or fewer mounting brackets could alternatively correspond to any of the sets of linking members 154 and 156, 158 and 160, and 162 and 164, depending upon factors such as the dimensions of the concave 62, the rotor 38, etc.

Regardless, it will be appreciated that because each of the mounting brackets 186, 188, and 190 are preferably structurally identical, only a detailed description will be made in reference to the mounting bracket 186. As specifically illustrated in FIG. 5, the mounting bracket 186 is preferably a unitary embodiment of any suitable size or shape and constructed of a suitable rigid material, such as steel. The mounting bracket 186 preferably includes a plurality of mounting apertures, such as a mounting aperture 192, a mounting aperture 194, a mounting aperture 196, a mounting aperture 198, and a mounting aperture 200. The mounting apertures 192, 194, 196, 198, and 200 allow for the accommodation of different dimensions of linking members 154 and 156, concaves 62, rotors 38, etc. Accordingly, it is contemplated that the mounting bracket 186 could include additional or fewer mounting apertures, as needed.

In further reference to FIG. 5, an exemplary assembly of the preferred transverse pivot assembly mechanism 64 is provided. It will be understood that because of the preferred structural similarities between each of the three sets of linking members 154 and 156, 158 and 160, and 162 and 164 and the mounting brackets 186, 188, and 190, only a detailed description will be made in reference to the exemplary assembly of the linking members 154 and 156 and the mounting bracket 186.

As illustrated in FIG. 5, the lower aperture 174 of the linking member 154 is preferably pivotally coupled, through use of a suitable fastener, such as a pivot pin, with the upper aperture 110 of the shoulder lug 102. Similarly, the lower aperture 176 of the linking member 156 is preferably pivotally coupled, through use of a suitable fastener, such as a pivot pin, with the lower aperture 108 of the shoulder lug 102. Transverse pivot axes are preferably defined at each pivotal coupling.

In completing the transverse pivot assembly of the preferred transverse pivot assembly mechanism 64, the linking members 154 and 156 are further pivotally coupled to the mounting bracket 186. The mounting bracket 186 is preferably secured to the body 22 (FIG. 3) of the combine 20 (not shown) in an area above the left frame rail 82 of the concave frame 70 through use of suitable fasteners (not shown), such as bolts, welds, rivets, etc.

More specifically, as illustrated in FIG. 5, it can be seen that the upper aperture 178 of the linking member 154 is preferably pivotally coupled, through use of a suitable fastener, such as a pivot pin, to the mounting aperture 192 of the mounting bracket 186. Similarly, the upper aperture 180 of the linking member 156 is preferably pivotally coupled, through use of a suitable fastener, such as a pivot pin, to the mounting aperture 198 of the mounting bracket 186.

While pivotal coupling of the linking members 154 and 156 to the mounting apertures 192 and 198, respectively, is preferred, it should be understood that any of the other mounting apertures 194, 196, and 200 could alternatively be used, depending upon such factors as the dimensions of the linking members 154 and 156, the concave 62, the rotor 38 (not shown), etc. Additionally, while use of pivot pins are preferred for the pivotal couplings, other suitable fasteners, such as rivets, bolts, etc., could also be used. Regardless, transverse pivot axes are preferably defined at each pivotal coupling.

In a related preferred embodiment, the first ends 166 and 170 of the linking members 154 and 156 are pivotally coupled directly to the body 22 of the combine 20 (not shown) rather than to the mounting bracket 186. However, regardless of the mounting location, when properly mounted, it is preferred that the linking member 154 will be positioned substantially angular relative to the linking member 156, in a generally "crossed" or "X-shaped" configuration. (See FIG. 3.)

Figure 6:
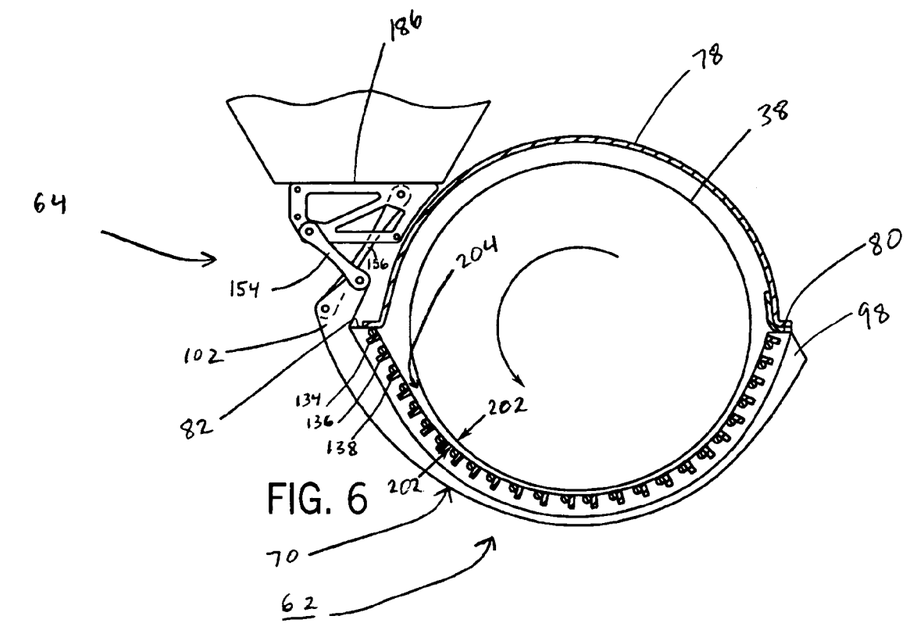
FIG. 6 is an enlarged front end longitudinal view, in the "hard threshing position," of the transverse pivot assembly mechanism shown in FIG. 3.
Figure 7:
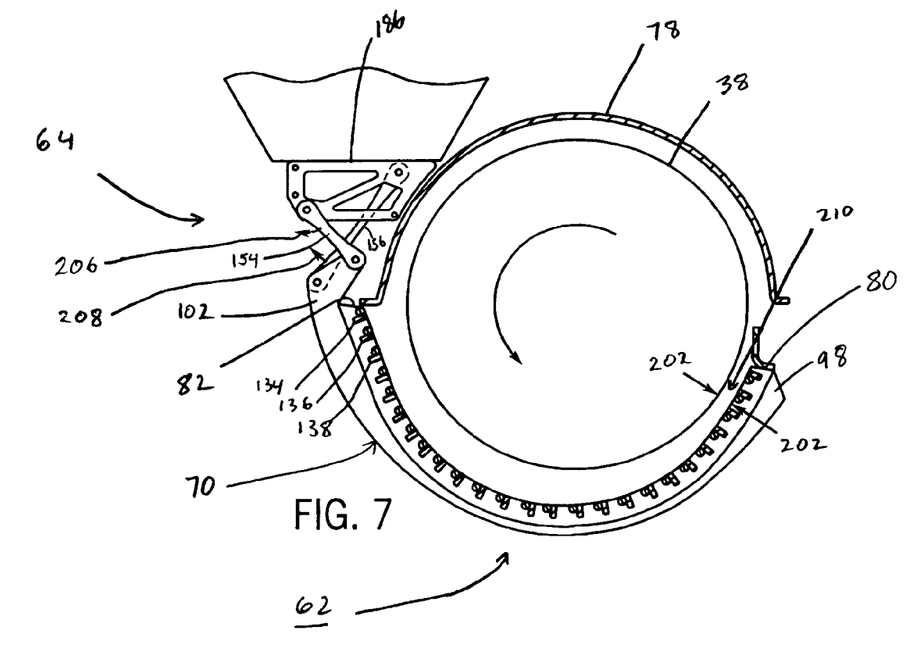
FIG. 7 is an enlarged front end longitudinal view, in the "easy threshing position," of the transverse pivot assembly mechanism shown in FIG. 3.
Figure 8:
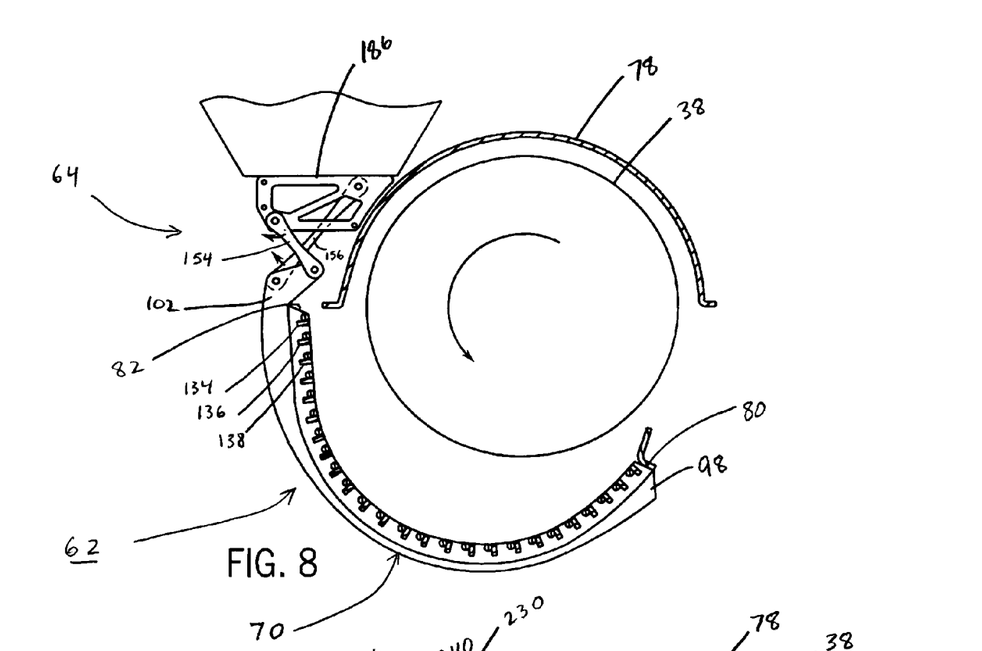
FIG. 8 is an enlarged front end longitudinal view, in the "fully opened position" (i.e. extended range), of the transverse pivot assembly mechanism shown in FIG. 3.

Referring now to FIGS. 6–8, operation of the preferred transverse pivot assembly mechanism 64 will be discussed. As shown in FIG. 6, the concave 62 is drawn near the rotor 38 of the combine 20 for the hard threshing of, for example, wheat. It can be seen that a pinch-point 202 is positioned at the lead in section 204 of the concave 62 so that the rotor will contact the crop grain immediately upon its downward rotation toward the concave 62.

Turning now to FIG. 7, it can be seen that the clearance spacing between the concave 62 and the rotor 38 has increased. Specifically, as the operator commands an increase of clearance spacing (e.g. through downward rotation of the adjustment mechanism 76) from within the operator's station 30 (not shown), the preferred transverse pivot assembly mechanism 64 automatically transversely pivots the concave 62 relative to the rotor 38.

More specifically, as indicated by the single-headed arrow 206, the linking member 154 transversely pivots in a generally right-to-left direction at the pivot axes defined by the coupling of the linking member 154 with the shoulder lug 102 and the mounting bracket 186. Further, as illustrated by the single-headed arrow 208, the linking member 156 pivots in a generally lower right-to-upper left direction at the pivot axes defined by the coupling of the linking member 156 with the shoulder lug 102 and the mounting bracket 186.

Accordingly, the simultaneous pivoting of the linking members 154 and 156 act to transversely position the pinch-point 202 from the lead in section 204 of the concave 62 to the lead out section 210 of the concave 62, where the rotor 38 will contact the crop grain upon its upward rotation away from the concave 62.

Turning now to FIG. 8, it can be seen that as the clearance spacing between the concave 62 and the rotor 38 continues to increase, the pinch-point 202 (not shown) disappears, allowing for the removal of lodged material from between the concave 62 and the rotor 38.

Thus, as discussed above, the preferred transverse pivot assembly mechanism 64 will automatically transversely position the pinch-point 202 of the concave 62 relative to the rotor 38 of the combine 20 in accordance with the clearance spacing set by the combine operator. Accordingly, it will be understood that when the concave 62 is lifted upward toward the rotor 38 from the position in FIG. 8 to the position in FIG. 6, the concave 62 will transversely pivot in an opposite manner (e.g. from left-to-right) than as described above.

While the preceding preferred transverse pivot assembly mechanism 64 is most desired, an alternative preferred transverse pivot assembly mechanism 68 is also contemplated. For example, the alternative preferred transverse pivot assembly 68 includes an alternative linking assembly having a plurality of non-rotatable members, such as a non-rotatable member 214, a non-rotatable member 216, and a non-rotatable member 218.

While the non-rotatable members 214, 216, and 218 are preferred, additional or fewer non-rotatable members could be used, depending upon factors such as the dimensions of the concave 66, the rotor 38 (not shown), etc. However, it will be understood that because the non-rotatable members 214, 216, and 218 are preferably structurally identical, only a detailed description will be made in reference to the non-rotatable member 214.

As illustrated in FIG. 10, the non-rotatable member 214 is preferably a gear constructed of a rigid material, such as metal, hardened plastic, hardened rubber, etc. A center-mounting aperture 220 is preferably defined within the non-rotatable member 214 for secure attachment to the shoulder lug 102 of the concave 66. However, it is also contemplated that instead of being a separable component, the non-rotatable member 214 could alternatively be unitarily configured as part of the shoulder lug 102. Regardless, it is preferred that the non-rotatable member 214 have a peripheral surface 222 defining a plurality of tines, such as a tine 224, a tine 226, a tine 228, etc.

Turning to FIGS. 9 and 10, it can be seen that the alternative preferred transverse pivot assembly mechanism 68 further includes a rotatable shaft 230, which is supported by the body 20 (not shown) of the combine 22 (not shown) in a longitudinal extent above the left frame rail 82 of the concave frame 70. The rotatable shaft 230 is adapted to accommodate a plurality of rotatable members, such as a rotatable member 232, a rotatable member 234, and a rotatable member 236, for rotation therewith.

While the rotatable members 232, 234, and 236 are preferred, it is contemplated that additional or fewer rotatable members could alternatively be used, depending upon factors such as the dimensions of the concave 66, the rotor 38, etc. Regardless, because the rotatable members 232, 234, and 236 are preferably structurally identical, it will be understood that only a detailed description will be made in reference to the rotatable member 232.

Accordingly, as depicted in FIG. 10, the rotatable member 232 is preferably a gear constructed of a rigid material, such as metal, hardened plastic, hardened rubber, etc. A center-mounting aperture 238 is defined through the center of the rotatable member 232, which allows the rotatable member 232 to be axially mounted to the rotatable shaft 230 for rotation therewith. The rotatable member 232 preferably further includes a peripheral surface 240 defining a plurality of tines, such as a tine 242, a tine 244, a tine 246, etc.

The alternative preferred transverse pivot assembly mechanism 68 further preferably includes multiple linking members, such as a linking member 248, a linking member 250, and a linking member 252. Accordingly, it is contemplated that a single linking member, such as the linking member 248, will correspond to a single non-rotatable member and rotatable member, such as the non-rotatable member 214 and the rotatable member 232.

However, additional or fewer linking members could be used, depending upon factors such as the dimensions of the concave 66, the rotor 38, etc. Regardless, because the linking members 248, 250, and 252 are preferably structurally identical, it will be understood that only a detailed description will be made in reference to the linking member 248.

Accordingly, as further illustrated by FIG. 10, it can be seen that the linking member 248 includes a first end 254 and a second end 256. Configured within the first end 254 is a lower aperture 258 for coupling with at least one of the non-rotatable member 214 and the shoulder lug 102. Similarly, an upper aperture 260 is configured within the second end 256 for coupling with at least one of the rotatable shaft 230 and the rotatable member 232.

Focusing further on FIG. 10, an exemplary assembly of the alternative transverse pivot assembly mechanism 68 is provided. It will be understood that because of the preferred structural similarities between each of the non-rotatable members 214, 216, and 218; the rotatable members 232, 234, and 236; and the linking members 248, 250, and 252, only a detailed description will be made in reference to the exemplary assembly of the non-rotatable member 214, the rotatable member 232, and the linking member 248.

Accordingly, it can be seen that the non-rotatable member 214 is preferably securely affixed, at its center-mounting aperture 220, to the aperture 120 of the shoulder lug 102. It is contemplated that any suitable fastener, such as a bolt, rivet, weld, etc., capable of securely affixing the non-rotatable member 214 to the shoulder lug 102, could be used.

As further illustrated, the rotatable member 232 is axially mounted to the rotatable shaft 230, at its center-mounting aperture 238, for rotation therewith. It is contemplated that any suitable fastener, such as a weld, adhesive, lock-nut etc., capable of securely affixing the rotatable member 232 to the rotatable shaft 230 for rotation therewith, could be used.

In completing the transverse pivot assembly, the linking member 248 is preferably securely affixed, at its lower aperture 258, to the center-mounting aperture 220 of the non-rotatable member 214 and the aperture 120 of the shoulder lug 102. While it is preferred that the first end 254 of the linking member 248 be securely (e.g. non-pivotally)

coupled to the non-rotatable member 214 and the shoulder lug 102, the first end 254 of the linking member 248 could alternatively be pivotally coupled to the non-rotatable member 214 and the shoulder lug 102. Regardless, it is contemplated that any suitable fastener, such as a weld, rivet, bolt, etc., could be used to affix the first end 254 of the linking member 248 to the non-rotatable member 214 and the shoulder lug 102.

Finally, the second end 256 of the linking member 248 is preferably pivotally coupled, at its upper aperture 260, to the rotatable shaft 230 and the rotatable member 232. While it is preferred that the second end 256 of the linking member 248 be pivotally coupled to the rotatable shaft 230 and the rotatable member 232, the second end 256 could alternatively be securely (e.g. non-pivotally) coupled to the rotatable shaft 230 and the rotatable member 232 for rotation therewith.

Referring now to FIG. 11, operation of the alternative transverse pivot assembly mechanism 68 will be discussed. As shown by the solid lines of the concave 66 in FIG. 11, the concave 66 is positioned near the rotor 38 of the combine 20 for the hard threshing of, for example, wheat. Specifically, the pinch-point 262 of the concave 66 is positioned at the lead in section 264 of the concave 66 so that the rotor 38 will contact the crop grain immediately upon its downward rotation toward the concave 66.

Referring now to the broken lines nearest the rotor 38, it can be seen that the clearance spacing between the concave 62 and the rotor 38 has increased. Specifically, as the operator commands an increase of clearance spacing (e.g. through downward rotation of the adjustment mechanism 76) from within the operator's station 30 (not shown), the alternative preferred transverse pivot assembly mechanism 68 automatically transversely pivots the concave 66 relative to the rotor 38.

More specifically, and in reference to the single-headed arrow 266, as the rotatable member 232 rotates relative to the non-rotatable member 214, the tines 242, 244, 246, etc. (see FIG. 10) of the rotatable member 232 engage the tines 224, 226, 228 etc. (see FIG. 10) of the non-rotatable member 214.

The engagement causes the concave 66 to automatically transversely pivot in a generally right-to-left direction (see broken line arrow 268) relative to the rotor 38. Accordingly, the pivoting of the concave 66 acts to transversely position the pinch-point 262 from the lead in section 264 to the lead out section 270 of the concave 66. In the lead out section 270, the rotor 38 will contact the crop grain upon its upward rotation away from the concave 66.

Turning now to the broken lines furthest from the rotor 38, it can be seen that as the clearance spacing between the concave 66 and the rotor 38 continues to increase, the pinch-point 262 disappears, allowing for the removal of lodged material from between the concave 66 and the rotor 38.

Thus, as discussed above, the alternative transverse pivot assembly mechanism 68 will automatically transversely pivot and position the pinch-point 262 of the concave 66 relative to the rotor 38 of the combine 20 (not shown) in accordance with the clearance spacing set by the combine operator. Accordingly, it will be understood that when the concave 66 is lifted upward from the broken lines furthest from the

What is claimed is:

1. A transverse pivot assembly mechanism for automatically positioning a pinch-point of a concave relative to a rotor of a combine, the mechanism comprising:

a linking assembly pivotally coupling said concave to said combine, said linking assembly defining at least one transverse pivot axis, said transverse pivot axis allowing automatic transverse pivot of said concave relative to said rotor in accordance with adjustably set clearance spacing between said concave and said rotor, wherein said linking assembly includes at least one non-rotatable member defining a peripheral surface, at least one rotatable member defining a peripheral surface, a rotatable shaft, and at least one linking member, wherein said non-rotatable member is mounted to said concave and said rotatable member is mounted to said rotatable shaft for rotation therewith, said peripheral surface of said rotatable member being engageable with said peripheral surface of said non-rotatable member, said linking member coupling at least one of said non-rotatable member and said concave with at least one of said rotatable shaft and said rotatable member.

2. The transverse pivot assembly mechanism of claim 1, wherein said rotatable member is rotatable relative to said non-rotatable member, said engagement of said peripheral surface of said rotatable member with said peripheral surface of said non-rotatable member allowing automatic transverse pivot of said concave relative to said rotor.

3. The transverse pivot assembly mechanism of claim 1, wherein said rotatable member is a gear, said peripheral surface of said gear including a plurality of tines, said plurality of tines engageable with said peripheral surface of said non-rotatable member.

4. The transverse pivot assembly mechanism of claim 1, wherein said linking member is pivotally coupled to at least one of said rotatable shaft, said rotatable member, said non-rotatable member, and said concave.

5. The transverse pivot assembly mechanism of claim 1, wherein said peripheral surface of said non-rotatable member includes a plurality of tines, said plurality of tines engageable with said peripheral surface of said rotatable member.

6. The transverse pivot assembly mechanism of claim 5, wherein said non-rotatable member is a gear.

7. A rotary combine comprising:

a rotor having a longitudinal axis of rotation;

a concave including a first side and a second side, said concave spaced circumferentially around said rotor and comprising a plurality of concave inserts outwardly removable away from said rotor in a direction transverse to said longitudinal axis of said rotor;

a transverse pivot assembly mechanism coupling said first side of said concave to said combine, said transverse pivot assembly mechanism comprising:

a linking assembly pivotally coupling said first side of said concave to said combine, said linking assembly defining at least one transverse pivot axis, said transverse pivot axis allowing automatic transverse pivot of said concave relative to said rotor in accordance with adjustably set clearance spacing between said concave and said rotor, said linking assembly including at least one non-rotatable member defining a peripheral surface, at least one rotatable member defining a peripheral surface, a rotatable shaft, and at least one linking member, wherein said non-rotatable member is mounted to said first side of said concave and said rotatable member is mounted to said rotatable shaft for rotation therewith, said peripheral surface of said rotatable member being engageable with said peripheral surface of said non-rotatable member, said linking member coupling at least one of said non-rotatable member and said first side of said concave with at least one of said rotatable shaft and said rotatable member; and     an adjustment mechanism coupling said second side of said concave to said combine, said adjustment mechanism allowing adjustment of clearance spacing between said concave and said rotor.

8. The rotary combine of claim 7, wherein said linking member is pivotally coupled to at least one of said rotatable shaft, said rotatable member, said non-rotatable member, and said concave.

9. The rotary combine of claim 7, wherein said rotatable member is a gear, said peripheral surface of said gear including a plurality of tines, said plurality of tines engageable with said peripheral surface of said non-rotatable member.

10. The rotary combine of claim 7, wherein said rotatable member is rotatable relative to said non-rotatable member, said engagement of said peripheral surface of said rotatable member with said peripheral surface of said non-rotatable member allowing automatic transverse pivot of said concave relative to said rotor.

11. The rotary combine of claim 7, wherein said non-rotatable member is unitarily configured with said first side of said concave.

12. The rotary combine of claim 7, wherein said peripheral surface of said non-rotatable member includes a plurality of tines, said plurality of tines engageable with said peripheral surface of said rotatable member.

13. The rotary combine of claim 12, wherein said non-rotatable member is a gear.

14. A method for automatically transversely pivoting and positioning a pinch-point of a concave relative to a rotor of a combine, the method comprising the steps of:

providing a rotor having a longitudinal axis of rotation;

providing at least one concave, said concave including a first side and a second side spaced circumferentially around said rotor and including a plurality of concave inserts outwardly removable away from said rotor in a direction transverse to said longitudinal axis of said rotor;

providing a transverse pivot assembly mechanism, said transverse pivot assembly mechanism coupling said first side of said concave to said combine, said transverse pivot assembly mechanism comprising:

a linking assembly pivotally coupling said first side of said concave to said combine, said linking assembly defining at least one transverse pivot axis, said transverse pivot axis allowing automatic transverse pivot of said concave relative to said rotor in accordance with adjustably set clearance spacing between said concave and said rotor, said linking assembly including at least one non-rotatable member defining a peripheral surface, at least one rotatable member defining a peripheral surface, a rotatable shaft, and at least one linking member, wherein said non-rotatable member is mounted to said first side of said concave and said rotatable member is mounted to said rotatable shaft for rotation therewith, said peripheral surface of said rotatable member being engageable with said peripheral surface of said non-rotatable member, said linking member coupling at least one of said non-rotatable member and said first side of said concave with at least one of said rotatable shaft and said rotatable member;

providing an adjustment mechanism, said adjustment mechanism adjustably coupling said second side of said concave to said combine for effecting movement and clearance spacing of said concave relative to said rotor of said combine; and     actuating said adjustment mechanism to effect movement and clearance spacing of said concave relative to said rotor of said combine.

\* \* \* \* \*